United States Patent
Hodges et al.

(10) Patent No.: US 9,625,702 B2
(45) Date of Patent: Apr. 18, 2017

(54) COUPLED CAVITY SPECTROMETER WITH ENHANCED SENSITIVITY AND DYNAMIC RANGE

(71) Applicants: Joseph T. Hodges, Washington Grove, MD (US); Jeremie Courtois, Gaithersburg, MD (US)

(72) Inventors: Joseph T. Hodges, Washington Grove, MD (US); Jeremie Courtois, Gaithersburg, MD (US)

(*) Notice: Subject to any disclaimer, the term of this patent is extended or adjusted under 35 U.S.C. 154(b) by 211 days.

(21) Appl. No.: 13/902,415

(22) Filed: May 24, 2013

(65) Prior Publication Data
US 2014/0347662 A1  Nov. 27, 2014

(51) Int. Cl.
*G01J 3/02* (2006.01)
*G02B 26/00* (2006.01)
*G01J 3/42* (2006.01)

(52) U.S. Cl.
CPC ............ *G02B 26/001* (2013.01); *G01J 3/021* (2013.01); *G01J 3/42* (2013.01)

(58) Field of Classification Search
CPC . G01J 3/0205; G01J 3/42; G01J 3/021; G02B 26/001
See application file for complete search history.

(56) References Cited

U.S. PATENT DOCUMENTS

| | | | |
|---|---|---|---|
| 6,452,680 B1* | 9/2002 | Paldus et al. | 356/436 |
| 2013/0044314 A1* | 2/2013 | Koulikov et al. | 356/72 |
| 2013/0228688 A1* | 9/2013 | Plusquellic et al. | 250/339.06 |
| 2014/0034848 A1* | 2/2014 | Campbell | 250/492.1 |
| 2014/0125993 A1* | 5/2014 | Kachanov et al. | 356/519 |

OTHER PUBLICATIONS

Jérémie Courtois, Joseph T. Hodges, "Coupled-cavity ring-down spectroscopy technique", Jun. 13, 2012, Optics Letters, vol. 37, No. 16.*

* cited by examiner

*Primary Examiner* — Michael A Lyons
*Assistant Examiner* — Violeta A Prieto
(74) *Attorney, Agent, or Firm* — Absolute Technology Law Group, LLC

(57) ABSTRACT

A coupled-cavity ring-down spectrometer utilizes an optical resonator to increase the reflectivity of ring-down cavity mirrors by adding external optical cavities that recycle light to the main cavity. These input and output cavities are made up of at least one coupling mirror and at least one movable recycling mirror. The movable recycling mirrors are coupled to at least one piezoelectric transducer, which generates movement of the recycling mirrors. The coupled-cavity ring-down configuration achieves higher spectrometer finesse, sensitivity and dynamic range.

11 Claims, 5 Drawing Sheets

COUPLED CAVITY SPECTROMETER WITH ENHANCED SENSITIVITY AND DYNAMIC RANGE

STATEMENT OF GOVERNMENT INTEREST

The invention described herein was made by employees of the United States Government and may be manufactured and used by or for the Government of the United States of America for governmental purposes without the payment of royalties.

CROSS-REFERENCE TO RELATED APPLICATIONS

The present application claims priority to U.S. Provisional Patent Application No. 61/648,100 filed on May 17, 2012 and to U.S. patent application Ser. No. 13/897,285 entitled "Coupled Cavity Spectrometer With Enhanced Sensitivity and Dynamic Range" filed on May 17, 2013.

FIELD OF INVENTION

The present invention relates to the field of optical resonators, and more specifically to coupled-cavity optical resonators.

BRIEF DESCRIPTION OF THE DRAWINGS

FIG. 5 further illustrates the measured empty cavity decay time constants together with the corresponding effective finesse.

ACRONYMS

Figure 1:
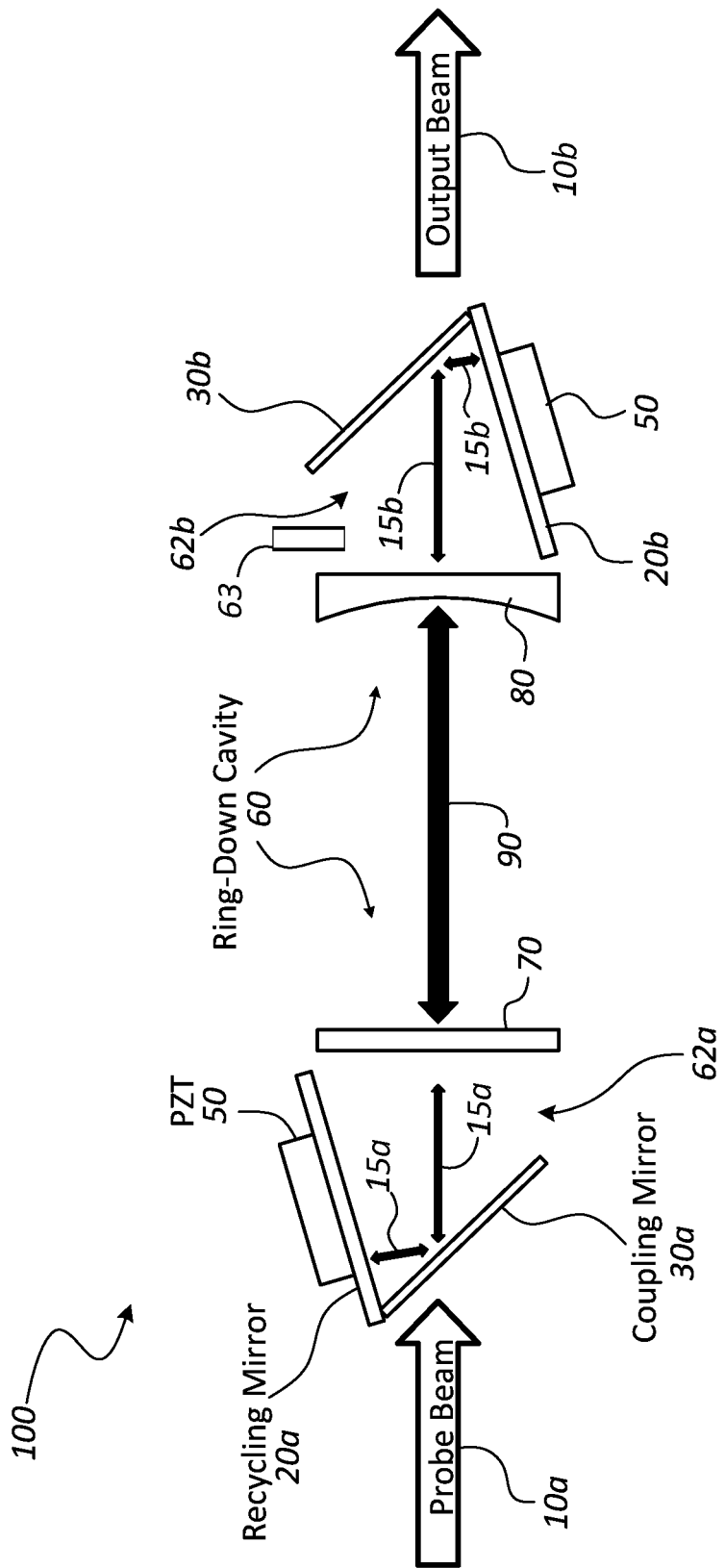
FIG. 1 illustrates an exemplary embodiment of a coupled-cavity ring-down spectrometer.

CRDS—Cavity Ring-Down Spectroscopy
DBS—Dichroic Beam Splitter
FBC—Feed Back Cavity
FBM—Feed Back Mirror
RDC—Ring-Down Cavity
PZT—Piezoelectric Transducer

GLOSSARY

As used herein, the term "absorption coefficient" is the loss-per-unit length (also known as the extinction coefficient).

As used herein, the term "angle of reflection" means the angle between the line that is perpendicular to a mirror surface and the direction of reflected light from the mirror.

As used herein, the term "recycling mirror" or "feedback mirror" means a variably positioned mirror with a preselected reflectivity value which may be altered by repositioning.

As used herein, the term "detection limit" means a dimensionless quantity and represents the minimum measurable fractional change in the laser beam intensity as it propagates through the length of the ring-down cavity. The detection limit may be expressed as $(u(\tau)/\langle\tau\rangle)*\pi/(\text{Finesse})$. Where $u(\tau)$ is the uncertainty (one standard deviation) of the measured time constant, and $\langle\tau\rangle$ is the mean value of the measured time constant.

As used herein, the term "displacement" means the difference in position of the recycling mirror due to the change in angle of reflection.

As used herein, the term "dynamic range" means the range of the largest to smallest absorption strength signal as achieved by the overall reflectivity range achieved by a CRDS.

As used herein, the term "etalonging" means the effect interference between unwanted reflections from external optical elements back to the ring-down cavity.

As used herein, the term "finesse" is a dimensionless measurement of the lifetime of the photon in the resonator that indicates the sensitivy of the resonator, and as the sensitivity increases the finesse value increases.

As used herein, the term "piezoelectric transducer" (PZT) means a device that provides micrometric linear translation or which actuates or displaces a recycling or feedback mirror and all functionally equivalent devices.

As used herein, the term "recycling mirror" refers to a mirror external to the optical component that reflects light back into a cavity.

As used herein, the term "reflectivity value" means a numeric value signifying the amount of light reflected from a mirror. A reflectivity value may be varied by positioning a mirror or according to the manufacturing specifications for the mirror.

As used herein, the term "sensitivity" means a value reflecting the smallest quantity of change per unit length that a system is capable of measuring. There is an inverse relationship between sensitivity and finesse.

As used herein, the term "time constant" is a time quantity which reflects the photon decay lifetime.

BACKGROUND

An optical cavity resonator is an arrangement of mirrors that forms a standing wave cavity for resonating light waves.

Cavity ring-down spectroscopy (CRDS) is a highly sensitive optical spectroscopic technique that enables very precise measurement of samples that scatter and absorb light. CRDS is used to study gas, liquid, and dispersed aerosol samples which absorb light at specific wavelengths. CRDS can be used to determine mole fractions of analytes down to the parts per trillion level.

A CRDS setup measures how long it takes for the light to decay to 1/e of its initial intensity, and this "ring-down time" can be used to calculate the concentration of the absorbing substance present in the cavity. The laser is then turned off in order to allow the measurement of the exponentially decaying light intensity leaking from the cavity. During this decay, light is reflected back and forth thousands of times between the mirrors, giving an effective path length for the extinction on the order of a few kilometers.

A typical CRDS setup consists of a laser and one or more highly reflective mirrors (generally two). The mirrors are placed in optical communication with each on opposite sides of a high-finesse optical cavity. If a sample placed in a cavity absorbs light, the amount of light decreases faster and the photon life is decreased.

The finesse of an optical cavity is represented as the total phase change (in radians) of the oscillating electromagnetic wave (i.e. the laser beam) over the time that the beam is trapped in the resonator. One exemplary equation that may be used to represent finesse is: $2\pi$ (effective path length)/ (round-trip path length). Finesse equals $\pi/(1-R)$ where R is the intensity reflectivity of the ring-down cavity mirror.

It is desirable to maximize the finesse value of an optical cavity in order to maximize the time a beam is trapped in the resonator, referred to as the photon lifetime. The longer the photon lifetime, the more sensitive the measurement.

In addition to finesse there are several other key performance parameters of a CRDS system known in the art. These measurements include wavelength coverage, dynamic range, detection limit, and sensitivity.

CRDS systems may be configured for specific experimental needs by structurally altering attributes including: (1) distance between mirrors in optical cavity; (2) the angle of reflection of each mirror; (3) the number of mirrors in a cavity; and (4) the preselected reflectivity value of each mirror. It is also known in the art to use dielectric films to increase the reflectivity value.

One problem known in the art is that mirrors for CRDS applications are custom manufactured and have preselected reflectivity value depending on the experimental application for which they are used. The reflectivity value cannot be readily altered after manufacturing resulting in a need for numerous custom mirrors to perform exacting experimentation techniques.

Another problem known in the art is that custom mirrors generally have an upper bound on their reflectivity. Additionally, commercially available mirrors generally have a maximum reflectivity value of 0.99999.

It is desirable to increase the maximum attainable reflectivity values available during an experimental process to allow CRDS measurements to be performed over a wider range of physical conditions.

It is further desirable to increase the key performance parameters attainable by a CRDS system known in the art, including finesse wavelength coverage, dynamic range, detection limit, and sensitivity.

SUMMARY OF THE INVENTION

The present invention uses controlled feedback of the probe laser beam to a ring-down cavity, which leads to interference between the internally circulating light and that which is fed back through one or more coupled cavities mirror ports. The channeled use of the interference (etaloning) alters the finesse of the optical resonator in a controlled and quantifiable manner. A coupled cavity component may be used for each primary ring-down mirror. In various embodiments the number of coupled cavities may be equal to or less than the number of primary ring-down mirrors used in standard ring-down cavity.

The coupled cavity configuration enhances the performance of a spectrometer by increasing the finesse of an optical resonator. The invention reduces interferences known as etalons that cause u(tau) to increase. As u(tau) decreases, so does the detection limit.

The coupled cavity configuration increases the key performance parameters of wavelength coverage, dynamic range, detection limit, and sensitivity.

The invention achieves 10- to 40-fold lower detection limits and 20-fold wider range of concentration. The invention more than doubles the wavelength coverage for a given set of mirrors. The invention enables laser-based spectrometer methods to be applied over a wider range of physical conditions than with current technology. Exemplary applications include rare and multiple substituted isotopologues $^{14}CO_2$, $^{13}C^{18}O$ $^{16}O$; measurement of ultra-low concentrations (<1 part-per-trillion) of gases, aerosols, and nanoparticles in environmental monitoring or green house gases and other trace gas and high-purity gas montioring.

DETAILED DESCRIPTION OF INVENTION

For the purpose of promoting an understanding of the present invention, references are made in the text to exemplary embodiments of a coupled-cavity ring-down spectrometer, only some of which are described herein. It should be understood that no limitations on the scope of the invention are intended by describing these exemplary embodiments. One of ordinary skill in the art will readily appreciate that alternate but functionally equivalent coupled-cavity ring-down spectrometers may be used. The inclusion of additional elements may be deemed readily apparent and obvious to one of ordinary skill in the art. Specific elements disclosed herein are not to be interpreted as limiting, but rather as a basis for the claims and as a representative basis for teaching one of ordinary skill in the art to employ the present invention.

It should be understood that the drawings are not necessarily to scale; instead emphasis has been placed upon illustrating the principles of the invention. In addition, in the embodiments depicted herein, like reference numerals in the various drawings refer to identical or near identical structural elements.

Moreover, the terms "substantially" or "approximately" as used herein may be applied to modify any quantitative representation that could permissibly vary without resulting in a change in the basic function to which it is related.

FIG. 1 illustrates an exemplary embodiment of the coupled-cavity ring-down spectrometer 100 which utilizes two coupled cavities: an input recycle cavity 62a and an output recycle cavity 62b.

FIG. 1 illustrates a first probe beam 10a injected through input coupling mirror 30a. Input coupling mirror 30a is placed at approximately 45 degrees relative to first probe beam 10a. First probe beam 10a is reflected as a recycled probe beam 15a between input recycling mirror 20a and first primary ring-down mirror 70. Input recycling mirror 20a has a second angle of reflection. Piezoelectric transducer (PZT) actuator 50 microscopically moves input recycling mirror 20a at sub-wavelength intervals to alter the axial displacement of said input recycling mirror 20a. First probe beam 10a is injected through first primary ring-down mirror 70 and reflected back from second primary ring-down mirror 80 establishing the beam path 90. Light that leaks out past second primary ring-down mirror 80 is then recycled back as a recycled output beam 15b into the ring-down cavity 60 by output recycling mirror 20b and output coupling mirror 30b. Any light that leaks out beyond the output mirrors creates the output beam 10b. At least one sensor 63 continuously measures a finesse of output recycle cavity 62b.

One exemplary embodiment of a coupled-cavity ring-down spectrometer 100 may utilize a 74 cm long ring-down cavity 60 and a feedback cavity with an approximate finesse of 16. The use of a dual cavity configuration increases the decay time constant from 210 μs to 280 μs, corresponding to an increase of finesse from $2.7 \times 10^5$ to $3.6 \times 10^5$. In this embodiment where a second recycle cavity is utilized, ring-down times as long as 0.5 ms, which is equivalent to $(1-R) \approx 4.9 \times 10^{-6}$, where R is the effective mirror reflectivity may be achieved.

Figure 2:
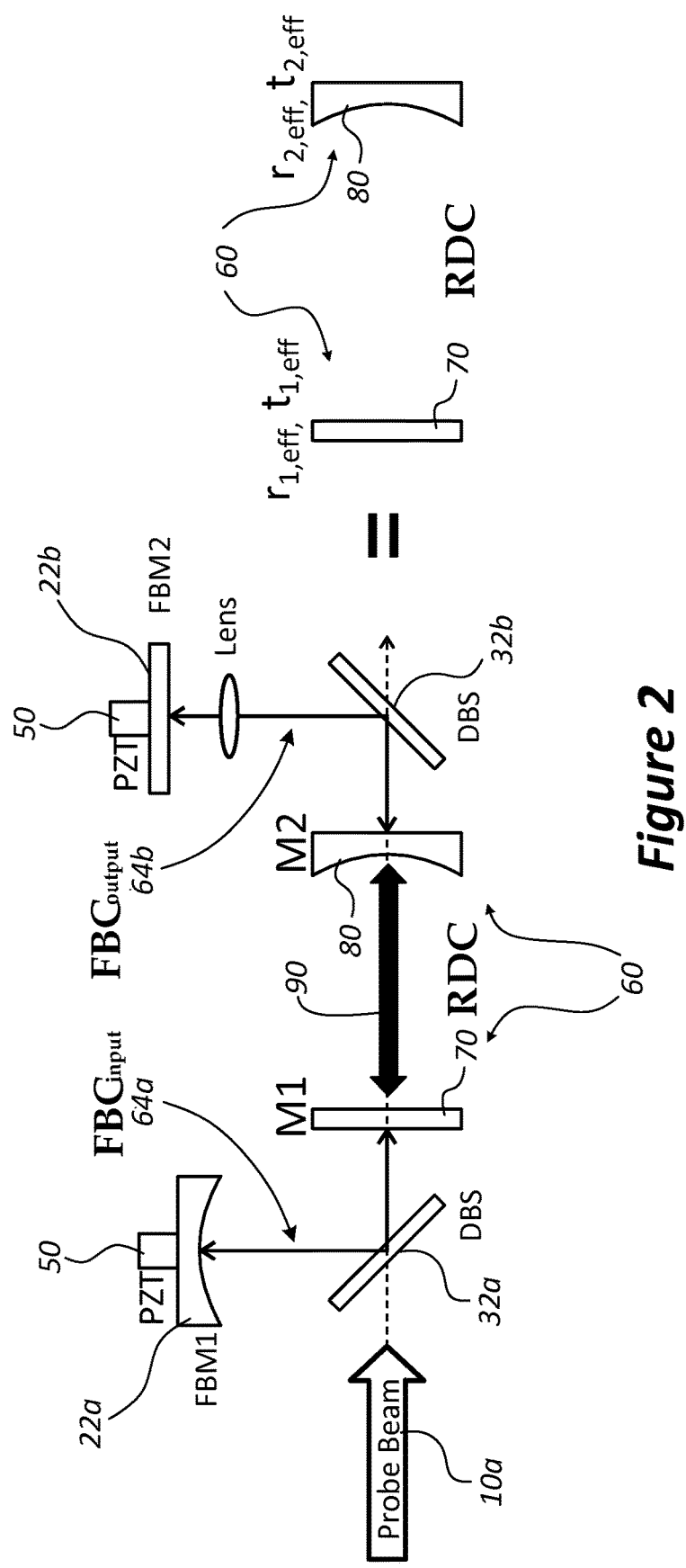
FIG. 2 illustrates an exemplary embodiment of a coupled-cavity ring-down spectrometer and its corresponding equivalent optical system.

FIG. 2 illustrates the functional equivalence of a coupled-cavity ring-down spectrometer 100 which utilizes first primary ring-down mirror 70 and second primary ring-down mirror 80 which have polished with low-scatter substrates and coated with layers of dielectric material having variable refractive index.

For an empty cavity with lossless mirrors (i.e., no scattering or absorption) of intensity reflectivity R and mirror-to-mirror distance L, the ring-down time constant is given by $\tau_0=L(cT)^{-1}$ where c is the speed of light and $T=1-R$ is the mirror transmittance. The absorption coefficient of the cavity medium is inferred by measuring small changes in the ring-down time, and its limit of detection is nominally equal to $\in_T TL^{-1}$. Here $\in_T$, whose magnitude is influenced by statistical effects such as signal strength and detector and digitizer noise, is the relative standard uncertainty in the measured ring-down time $\tau$. Long-term averaging of $\tau$ to improve measurement precision is often limited by uncertainty and variability in the base losses $T \times L^{-1}$ $(c\tau_0)^{-1}$ that are caused by interference involving unwanted reflections from external optical elements back to the ring-down cavity 60 (RDC).

This effect, known as etaloning, increases in importance as R approaches unity. Etaloning leads to an effective RDC mirror reflectivity, $R_{eff}$, that can be greater or less than that of the isolated mirror. In CRDS and other cavity-enhanced experiments, etaloning is manifest by slow temporal variation and sinusoidal wavelength dependence in $\tau_0$. This occurs because the effective base losses are sensitive to uncontrolled variations in the phase of the optical feedback (from external cavities) that are caused by drift in\the relevant optical path lengths.

In the exemplary embodiment shown, a voltage applied to PZT actuator 50 allows for displacement of input feedback mirror 22a and output feedback mirror 22b to occur. The ring-down cavity time constant is calculated from the etaloning between the input dichroic beam splitter (DBS) mirror 32a and output dichroic beam splitter (DBS) mirror 32b and the first primary ring down mirror 70 and secondary primary ring down mirror 80. The input feedback mirror 22a and output feedback mirror 22b are then locked into position when the desired reading is achieved.

In the exemplary embodiment shown, the coupled-cavity ring-down spectrometer 100 utilizes a RDC 60 that includes a first primary ring-down mirror 70 and second primary ring-down mirror 80. First primary ring-down mirror 70 and second primary ring-down mirror 80 have intensity reflectivities $R_1$ and $R_2$ respectively. The coupled-cavity ring-down spectrometer 100 has an input feedback cavity 64a and an output feedback cavity 64b which consists of two feedback mirrors 22a and 22b and a DBS mirror 32a or 32b.

For the isolated RDC system, the geometric mean value of the reflectivity is given by $R=(R_1R_2)^{1/2}$. In various embodiments the coupled-cavity ring-down spectrometer 100 system in which there is retroflection to the RDC 60, $R_1$ and $R_2$ can be replaced by their respective effective values, which we denote by $r_{1,eff}$ and $r_{2,eff}$. This enables us to describe an equivalent two-mirror RDC 60 with a coupled-cavity system that takes into account the light-recycling influence of the recycling mirrors 20a or 20b. Analysis of $r_{1,eff}$ and $r_{2,eff}$ requires that one include not only the principal reflection occurring at each RDC mirror but also interference by the transmitted field that is fed back through the cavity end mirror from the feedback mirrors 22a and 22b.

In the embodiment shown in FIG. 2, the value $r_{1,eff}$ can be used to express how time constants change as the mirror $r_{1,eff}$ corresponds to the first primary ring-down mirror 70 and is no longer equal to the square of its wavelength-dependent absolute reflectivity $|r_1{}^2|$, as in an isolated RDC system, but is a function of $t_1=(1-r_1{}^2)^{1/2}$, $\phi_{FBC}=2\pi L_{FBC}\lambda-1$, $r_{DBS}$, $r_{FBM}$, $t_{extra}$, and $C_{00}$, where $t_1=(1-r_1{}^2)^{1/2}$ is the amplitude transmission of the first primary ring-down mirror 70;

$\phi_{FBC}=2\pi L_{FBC}\lambda-1$ is the single-pass phase shift experienced by the light within the FBC;

$r_{DBS}$ is the amplitude reflectivity of the DBS mirrors 32a and 32b;

$r_{FBM}$ is the amplitude reflectivity of the FBM mirrors 22a and 22b;

$t_{extra}$ the net amplitude transmission through the FBC medium; and $C_{00}$ is the fundamental transverse electromagnetic mode (TEM$_{00}$) amplitude coupling coefficient of the feedback beam, respectively.

An expression for $r_{1,eff}$ is obtained by evaluating $|r_1+r^2t^2{}_1 S_{FBC}|^2$, where the first term corresponds to the directly reflected part $(r_1 A^{inc})$ and the second term is the feedback contribution. Here $r^2=-1$, and $S_{FBC}=C_{00}r_{FBM} r^2{}_{DBS}t^2{}_{extra}e^{2i\phi FBC}\sum_{n=0}^{\infty}(r_1r_{FBM}r^2{}_{DBS}t^2{}_{extra}e^{2i\phi FBC})^n$ is the dimensionless circulating field amplitude, which has undergone multiple round-trips in the external FBC. Evaluating this summation leads to an effective intensity reflectivity for $M_1$ of where we note that (assuming $r_1 \approx 1$) the second term in the sum corresponds to the Airy transmission formula for a resonator with round-trip losses of $r_1r_{FBM}r^2{}_{DBS}t^2{}_{extra}$ and phase delay of $2\phi_{FBC}$.

Figure 3:
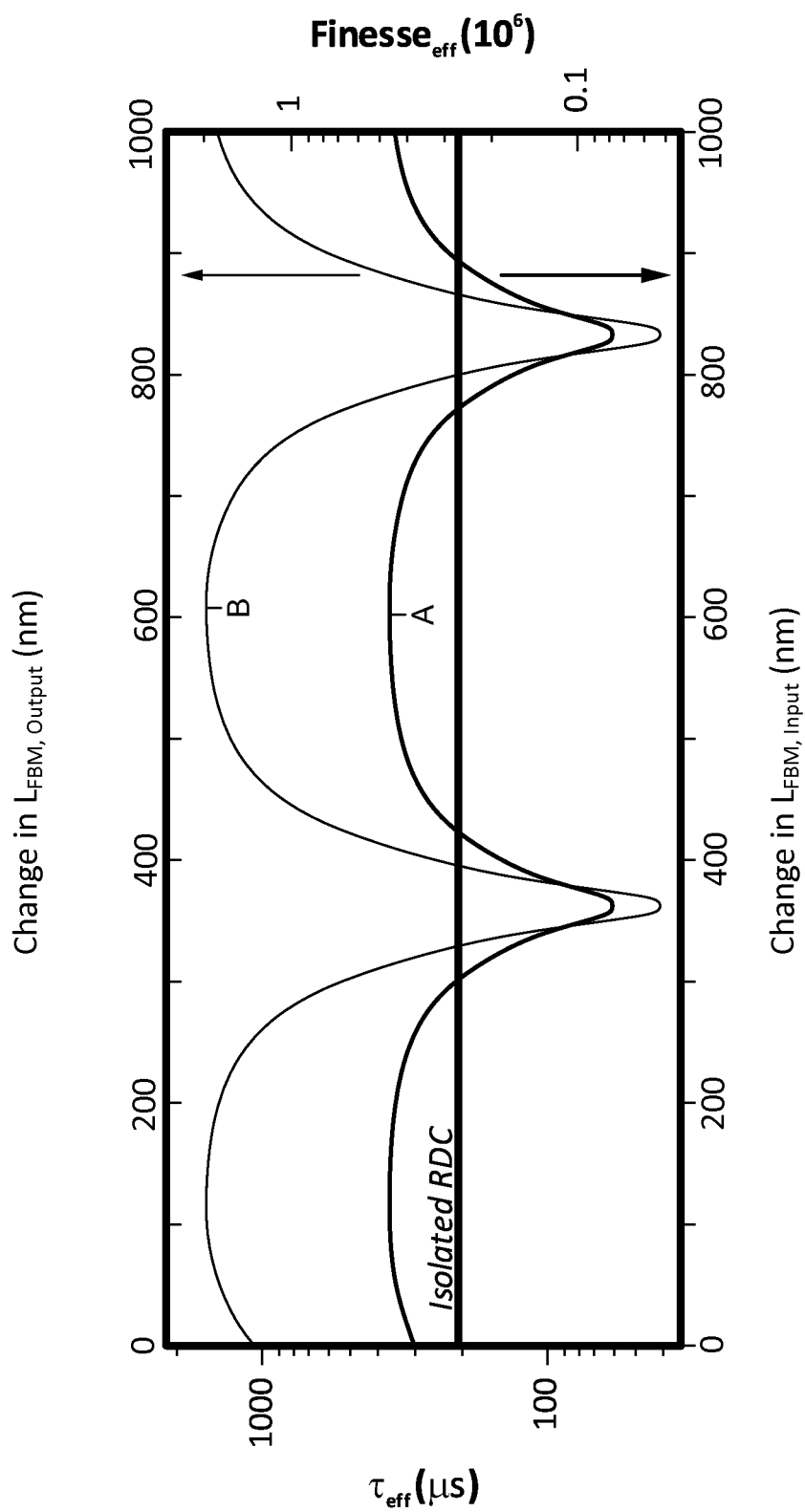
FIG. 3 is a schematic which illustrates the principle of the coupled-cavity ring-down spectrometer and its corresponding equivalent optical system.

FIG. 3 is a schematic which illustrates the principle of the coupled-cavity ring-down spectrometer and its corresponding equivalent optical system. Once the probe-beam intensity has been interrupted, the light leaks out of the ring-down cavity at a rate dictated by its round-trip losses (isolated system). In the coupled-cavity case, the reflected field from the input recycling mirror 20a arises from the direct reflection of the circulating field within the ring-down cavity 60 plus the portion of the recycled probe beam 15a in the feedback cavity that retro reflects from the input recycling mirror 20a and couples back into the ring-down cavity through the first primary ring-down mirror 70. This coupled-cavity mechanism alters the effective reflectivity of mirror in the equivalent optical system, thus altering the finesse of the ring-down cavity.

From FIG. 3, the modified RDC time constant in the case of light recycling through the input mirror $M_1$ by the FBC is given as $\tau_{eff}=L/(c(1-(r_{1,eff}R_2)^{1/2}))$. In FIG. 3, the curve A shows a calculation of the modified RDC time constant, $\tau_{eff}$, for an ideally lossless system $(t_{extra}=C_{00}=1)$ as a function of the input FBM displacement, $\Delta L_{FBC,Input}=L_{FBC,Input}-L_{FBC,Input,0}$. The calculations are based on the CC-RDS system experimental values discussed below: $L_{FBC,Input,0}=L \approx 74$ cm, $R_1=R_2=99.9988\%$ (equivalent to $T=1.2 \times 10^{-5}$ and corresponding to the measured decay time $\tau_0=210$ μs for the TEM$_{00}$ mode of the isolated RDC), $R_{DBS}=0.71$ for the sagittal field polarization (s polarization) at $\lambda \approx 940$ nm and $R_{FBM}=R_1$. The self-mixing effect leads to a $\lambda/2$ periodic $L_{FBC}$-dependent modulation in $\tau_{eff}$ about $\tau_0$. For in-phase self-mixing of the two fields, the original value of $T_1=1.2 \times 10^{-5}$ for $M_1$ is reduced two-fold to $T_{1,eff}=5.9 \times 10^{-6}$ ($\tau_{eff,max}=280$ μs). This change in effective mirror transmittance, which is caused by the addition of the feedback resonator with a finesse of about 16 [$F=\pi\sqrt{Rm}(1-R_m)^{-1}$, where $R_m=(R^2{}_{DBS}R_{RDC}R_{FBM})^{1/4}$ is the mean reflectivity of the FBC], corresponds to an increase in F from ~2.7×10$^5$ (isolated ring-down cavity) to ~3.6×10$^5$ (coupled-cavity case).

FIG. 3 also illustrates through curve B the periodic behavior of $\tau_{eff}$ when one simultaneously introduces a second FBC, the "output" FBC, to recycle the light that leaks through the output mirror of the cavity. In these simulations, F=31 for the output FBC. The input FBC (which reinjects the light through $M_1$) is fixed in length to maximize $r_{1,eff}$ while the distance between $M_2$ and the output FBM is varied. The maximum finesse equals as much as ~2×10$^6$, with a corresponding $\tau_{eff}$ of ~1.56 ms.

Figure 4:
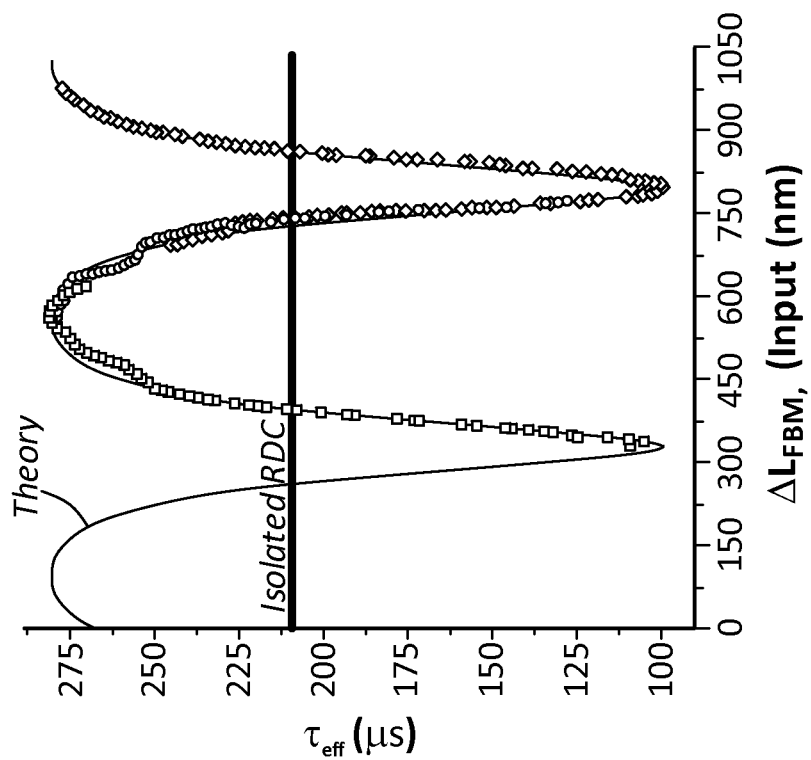
FIG. 4 is a graph of the theoretical dependence of the effective time constant $\tau_{eff}$ on changes in the input and output FBC lengths, $\Delta L_{FBM}$.

FIG. 4 illustrates the theoretical dependence of the effective time constant $\tau_{eff}$ on changes in the input (lower) and output (upper) FBC lengths, $\Delta L_{FBM}$. While the latter case corresponds to an input that maximizes, both cases consider lossless FBC systems. The line labeled "Isolated RDC" is the nominal observed decay time constant of the isolated system. Parameters correspond to experimental configuration and are given in the text. For $\Delta L_{FBM}$ cases that yield finesse values outside of the extreme, the measurement statistics were highly sensitive to small variations in $\Delta L_{FBM}$.

Figure 5:
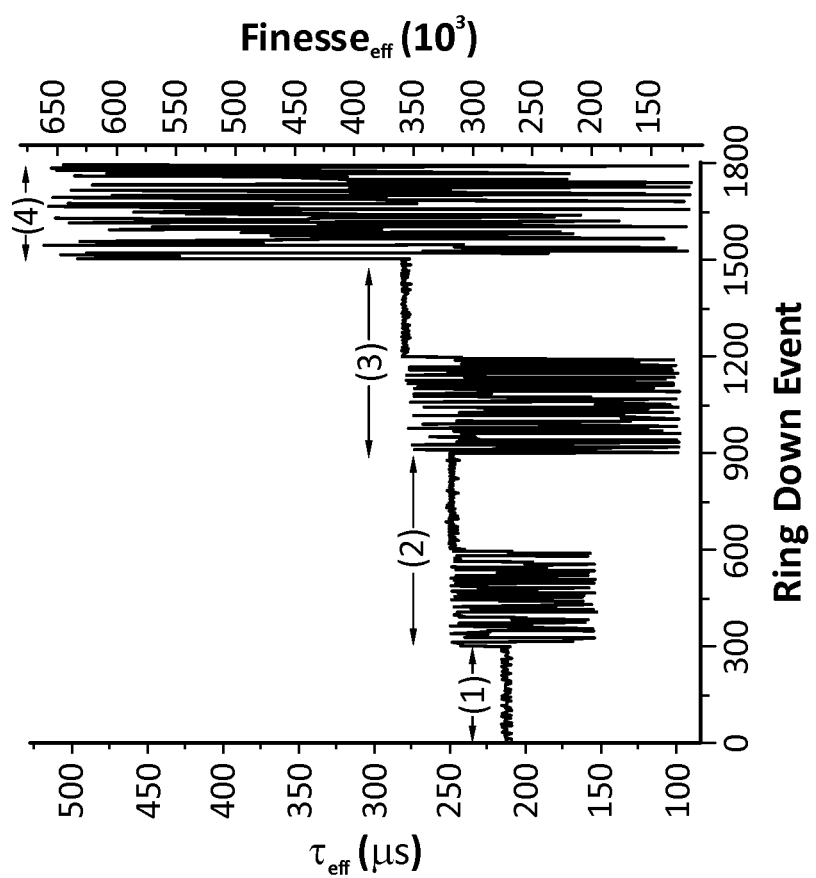
FIG. 5 illustrates the comparison of three sets of measurements with theoretical predictions.

FIG. 5 illustrates the comparison of three sets of measurements with theoretical predictions. The line labeled "Isolated RDC" is the nominal observed decay time constant of the isolated system, and the curve labeled "Theory" is based on experimental parameters given in the text.

FIG. 5 illustrates the measured empty cavity decay time constants together with the corresponding effective finesse. In (1), the RDC is isolated, while for cases (2) and (3), one FBC is used to change the effective finesse of the RDC through alteration of $r_{1,eff}$. In the latter recycling system, the finesse for the input FBC for the s- and p-polarization states of the probe beam are 7 and 18, respectively, explaining the differences in modulation depth when the FBM is dithered. Flat data regions correspond to an actively length-stabilized FBC. In (4), a second output FBC was introduced, while the input FBC length was both adjusted and maintained to maximize $r_{1,eff}$.

What is claimed is:

1. A coupled-cavity ring-down spectrometer apparatus comprised of:
   at least one input recycle cavity which is comprised of at least one first primary ring-down mirror, at least one movable input recycling mirror and at least one input coupling mirror, wherein said at least one first primary ring-down mirror, said at least one movable input recycling mirror and said at least one input coupling mirror have a quantified reflectivity value;
   said at least one input coupling mirror positioned at a first angle of reflection relative to said at least one first primary ring-down mirror to produce a first target reflectivity value and wherein said first angle of reflection is relative to said at least one first primary ring-down mirror and is a function of said first target reflectivity value;
   said at least one movable input recycling mirror having a second target reflectivity value wherein said at least one movable input recycling mirror is positioned at a second angle of reflection relative to said at least one first primary ring-down mirror to produce said second target reflectivity value and wherein said second angle of reflection is a function of said second target reflectivity value;
   at least one output recycle cavity formed by at least one second primary ring-down mirror, at least one output coupling mirror and at least one movable output recycling mirror;
   at least one primary ring-down cavity formed between said at least one input recycle cavity and said at least one output recycle cavity; and
   at least one resonator operatively coupled with at least one piezoelectric transducer wherein said at least one piezoelectric transducer receives electrical signals from said at least one resonator to actuate movement of said at least one movable input recycling mirror and said at least one movable output recycling mirror; and
   at least one sensor which continuously measures a finesse of said at least one output recycle cavity.

2. The apparatus of claim 1 wherein said at least one primary ring-down cavity is formed between said at least one first primary ring-down mirror and said at least one second primary ring-down mirror.

3. The apparatus of claim 1 wherein said at least one input coupling mirror is affixed to a base component.

4. The apparatus of claim 1 wherein said at least one output coupling mirror is affixed to a base component.

5. The apparatus of claim 1 wherein said first angle of reflection is 10 to 65 degrees.

6. The apparatus of claim 1 wherein said second angle of reflection is 10 to 65 degrees.

7. The apparatus of claim 1 wherein said at least one primary ring-down mirror is comprised of a plurality of low-scatter substrates wherein said low scatter substrates are coated with layers of dielectric material having a variable refractive index.

8. The apparatus of claim 1 wherein said first angle of reflection of said at least one input coupling mirror has a perpendicular incidence to said at least one first primary ring down cavity mirror.

9. The apparatus of claim 1 wherein said at least one input coupling mirror is positioned at an angle of reflection between 10 and 80 degrees.

10. The apparatus of claim 9 wherein said at least one input coupling mirror has a first target reflectivity value of 50 to 99%.

11. The apparatus of claim 9 wherein said second reflectivity value of said at least one movable input recycling mirror is not less than 95%.

* * * * *